United States Patent [19]

Ohtani

[11] Patent Number: 5,678,000
[45] Date of Patent: Oct. 14, 1997

[54] PRINTER CONTROL APPARATUS

[75] Inventor: Tsuyoshi Ohtani, Kawasaki, Japan

[73] Assignee: Canon Kabushiki Kaisha, Tokyo, Japan

[21] Appl. No.: 505,147

[22] Filed: Jul. 21, 1995

[30] Foreign Application Priority Data

Jul. 22, 1994 [JP] Japan ................ 6-170586

[51] Int. Cl.$^6$ ................ G06K 15/00
[52] U.S. Cl. ................ 395/102; 375/111
[58] Field of Search ................ 395/102, 139, 395/112, 111, 117, 789; 355/308, 311, 313, 314; 358/498, 440, 451; 399/361, 370, 376, 86

[56] References Cited

U.S. PATENT DOCUMENTS 5,208,902  5/1993  Kumon .................. 395/102

Primary Examiner—Arthur G. Evans
Attorney, Agent, or Firm—Fitzpatrick, Cella, Harper & Scinto

[57] ABSTRACT

In the case where a host computer judges that first paper size information of a recording medium which can be fed from a printer obtained by an obtaining unit for obtaining the first paper size information when a print request is inputted and second paper size information for set output information differ, kinds of print modes which can be changed are presented to a display.

8 Claims, 3 Drawing Sheets (a)  (b)

(a)  (b)

PRINTER CONTROL APPARATUS

BACKGROUND OF THE INVENTION

1. Field of the Invention

The present invention relates to a printer system for printing by analyzing print information including print data and control data which are inputted from a host computer.

2. Related Background Art

Hitherto, a printer unconditionally prints print data from a host computer onto a paper set in the printer or, when the print data is received from the host computer and the paper size designated in the print data is different from the paper size of a paper which can be fed, the printer merely executes a control such as to notify a user of an error and to request to change output conditions of the print data or the like.

When the paper size in the print data transferred from the host and the size of the paper set in the printer main body differ, however, there are problems such that all of the print data are not printed, a blank space is too large, and an image which is not expected by the user is printed.

When the print data is not sent, a mismatching state of the paper size is not notified. When such a state is notified, since it is necessary to instruct the change of the paper size setting by a printer driver or the like and a re-transmitting process of the same print data is also accompanied, a considerable time is necessary until a print result in a desired print size is obtained, so that there is also a problem that operability is bad.

The present invention is made to solve the above problems. An object of the invention is to provide a printer system with good operability in which, in the case where paper size information obtained from a printer main body when there is a print request from a host computer is different from paper size information which was set, by presenting print modes which can be changed by the user, the printing in a desired print mode can be instructed before output information to be printed is transferred to the printer main body.

SUMMARY OF THE INVENTION

According to the invention, the above object is accomplished by a printer system including obtaining means for obtaining first paper size information of a recording medium which can be fed from a printer main body; judging means for judging whether the first paper size information obtained by the obtaining means and second paper size information for output information which was set coincide; and presenting means for presenting kinds of print modes which can be changed to a display when the judging means judges that the first and second paper size information differ.

According to the invention, the printing system further has instructing means for selecting and instructing a desired kind of print mode from the plurality of kinds of print modes which can be changed and which were presented on the display by the presenting means; and notifying means for notifying an instruction of the different print mode together with the output information to the printer main body on the basis of the kind of print mode selected and instructed by the instructing means.

According to the invention, at least one of the plurality of kinds of print modes which can be changed is a mode in which a part of the output information is forcedly printed in the paper size of the paper which can be fed.

According to the invention, at least one of the plurality of kinds of print modes which can be changed is a mode in which the output information is reduced in size and is printed in the paper size of the paper which can be fed.

According to the invention, at least one of the plurality of kinds of print modes which can be changed is a mode in which the output information is divided in the paper size of the paper which can be fed and is divisionally printed onto a plurality of papers.

According to the invention, at least one of the plurality of kinds of print modes which can be changed is a print mode in which the paper size of the paper to be fed is changed.

According to the invention, the printer main body and the host computer can communicate through a predetermined interface.

According to the invention, the printer main body and the host computer can communicate through a predetermined network.

According to the invention, in the case where the judging means judges that the first paper size information obtained by the obtaining means for obtaining the first paper size information of the recording medium which can be fed from the printer main body when the printing request is inputted does not coincide with the second paper size information for the set output information, the presenting means presents, on the display, the kinds of print modes which can be changed, so that the user can select and instruct a desired print mode before transferring the output information to the printer main body.

According to the invention, when the desired kind of print mode is selected from the plurality of kinds of print modes presented on the display by the presenting means and is instructed, the notifying means notifies the instruction of the different print mode together with the output information to the printer main body on the basis of the kind of print mode selected and instructed, thereby enabling the output information to be outputted in a desired print mode from the printer main body.

According to the invention, when it is judged that the first and second paper size information differ, the presenting means presents on the display the mode in which a part of the output information is forcedly printed in the paper size of the paper which can be fed as a kind of print mode which can be changed, so that the user can select and instruct a desired print mode before transferring the output information to the printer main body.

According to the invention, when it is judged that the first and second paper size information differ, the presenting means presents on the display the mode in which the output information is reduced in size and printed in the paper size of the paper which can be fed as a kind of print mode which can be changed, so that the user can select and instruct a desired print mode before transferring the output information to the printer main body.

According to the invention, when it is judged that the first and second paper size information differ, the presenting means presents, on the display, the mode in which the output information is divided in the paper size of the paper which can be fed and is divisionally printed onto a plurality of papers as a kind of print mode which can be changed, so that the user can select and instruct a desired print mode before transferring the output information to the printer main body.

According to the invention, when it is judged that the first and second paper size information differ, the presenting means presents, on the display, the print mode in which the paper size of the paper which is fed is changed as a kind of print mode which can be changed, so that the user can select and instruct a desired print mode before transferring the output information to the printer main body.

According to the invention, in the case where the judging means judges that the first paper size information of the recording medium which can be fed from the printer main body obtained by the obtaining means through a predetermined interface when the print request is inputted is different from the second paper size information for the set output information, the presenting means presents on the display a plurality of kinds of print modes which can be changed, so that the user can select and instruct a desired print mode before transferring the output information to the printer main body through the predetermined interface.

According to the invention, in the case where the judging means judges that the first paper size information of the recording medium which can be fed from the printer main body obtained by the obtaining means through a predetermined network when the print request is inputted is different from the second paper size information for the set output information, the presenting means presents on the display a plurality of kinds of print modes which can be changed, so that the user can select and instruct a desired print mode before transferring the output information to the printer main body through the predetermined network.

DETAILED DESCRIPTION OF THE PREFERRED EMBODIMENTS

Figure 1:
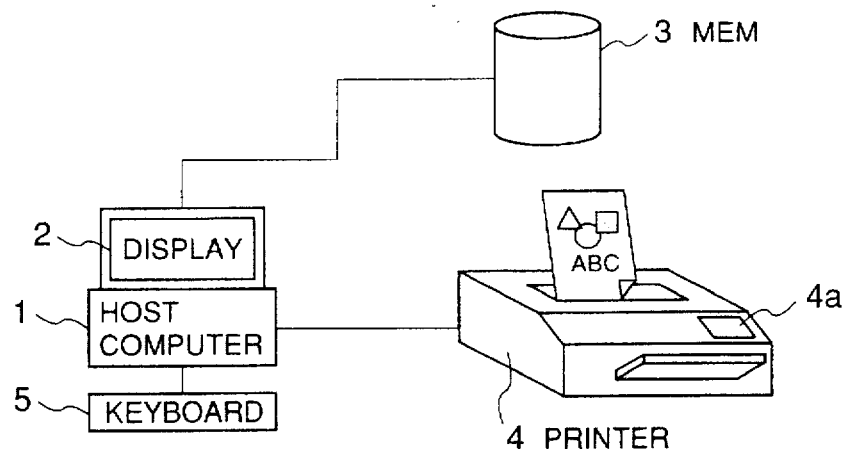
FIG. 1 is a schematic diagram for explaining a construction of a printer system shown as an embodiment of the invention.

FIG. 1 is a schematic diagram for explaining a construction of a printer system shown as an embodiment of the invention.

In the diagram, reference numeral 1 denotes a host computer comprising a CPU, an RAM, and an ROM (which are not shown). The CPU executes various data processes on the basis of a system program and an application program which are loaded from the ROM to the RAM. Reference numeral 2 indicates a display which is constructed by, for example, an FLC panel and which displays a state of the system, a data processing result, or the like. Reference numeral 3 denotes a memory having a recording medium such as hard disk (HD), magnetooptic disk, or the like. Reference numeral 4 denotes a printer which comprises, for example, a laser printer engine and the like and executes an electrophotographic process to output information (character, figure, and image, or a combination of them) and prints the processed information onto a recording medium which is fed from a paper-feeding section. The printer 4 has a paper size sensor (not shown), thereby notifying a printer controller (not shown) of the paper size of the paper which can be fed. The printer engine is not limited to only the laser beam printer engine but the invention can be also applied to an ink jet printer engine or the like. The printer 4 also has a plurality of paper feeding sections and a paper of a desired size can be fed from a cassette, a hand insertion tray, or the like to the main body. The printer 4 further has an operation panel 4a for instructing various operations. Although a construction such that the printer 4 and host computer 1 can communicate data through a predetermined interface is shown, it is also possible to construct such that the host computer 1 and printer 4 can communicate through a network (not shown). A printer system in which a plurality of printers are connected through a plurality of interfaces can be also used. It is also possible to construct such that a plurality of host computers and a plurality of printers can communicate data with each other through a network. Reference numeral 5 denotes a keyboard for inputting various data, commands, and the like, and to which a pointing device can be connected.

The correspondence between the embodiment and each means of the first to eighth inventions and their operations will be described hereinbelow with reference to FIG. 1.

According to the invention, in the printer system in which the host computer 1 having the display 2 and the printer 4 for analyzing and printing print information, including print data and control data, inputted from the host computer 1 are connected so that they can communicate, there are provided obtaining means for obtaining first paper size information of a recording medium which can be fed from the printer 4 when a print request is inputted (in the embodiment, the CPU (not shown) of the host computer 1 obtains the first paper size information by communicating with the printer controller of the printer 4); judging means for judging whether the first paper size information obtained by the obtaining means coincides with second paper size information for the set output information or not (in the embodiment, such a judgement is executed by the CPU (not shown) of the host computer 1); and presenting means for presenting to the display 2 a plurality of kinds of print modes which can be changed when the judging means judges that the first and second paper size information differ (in the embodiment, such a presentation is executed by the CPU (not shown) of the host computer 1). In the case where the first paper size information obtained by the obtaining means for obtaining the first paper size information of the recording medium which can be fed from the printer 4 when the host computer 1 inputs the print request is different from the second paper size information for the set output information, the kinds of print modes which can be changed are presented to the display 2, so that the user can select and instruct a desired print mode before transferring the output information to the printer 4.

According to the invention, the printer system further has instructing means (in the embodiment, the operation by the keyboard 5 or a pointing device (not shown)) for selecting and instructing a desired kind of print mode from the plurality of kinds of print modes which can be changed and which were presented on the display 2 by the presenting means (by the host computer 1); and notifying means (by the CPU (not shown) of the host computer 1) for notifying the printer 4 of an instruction of a different print mode together with the output information on the basis of the kind of print mode which was selected and instructed by the instructing means. When the desired kind of print mode is selected by an operation of the keyboard 5 from the plurality of kinds of print modes presented on the display 2 by the host computer 1 and is instructed, the notifying means notifies the instruction of the different print mode together with the output information to the printer 4 on the basis of the kind of print mode selected and instructed, thereby enabling the output information to be outputted in a desired print mode from the printer 4.

According to the invention, when it is judged that the first and second paper size information differ, the presenting means (by the host computer 1 in the embodiment) presents on the display 2 the mode (FIG. 3) in which a part of the output information is forcedly printed in the paper size of the paper which can be fed as a kind of print mode which can be changed, so that the user can select and instruct a desired print mode before transferring the output information to the printer 4.

According to the invention, when it is judged that the first and second paper size information differ, the presenting means (by the host computer 1 in the embodiment) presents on the display 2 the mode (FIG. 4) in which the output information is reduced in size and printed in the paper size of the paper which can be fed as a kind of print mode which can be changed, so that the user can select and instruct a desired print mode before transferring the output information to the printer 4.

According to the invention, when it is judged that the first and second paper size information differ, the presenting means (by the host computer 1 in the embodiment) presents on the display 2 the mode (FIG. 5) in which the output information is divided in the paper size of the paper which can be fed and is divisionally printed onto a plurality of papers as a kind of print mode which can be changed, so that the user can select and instruct a desired print mode before transferring the output information to the printer 4.

According to the invention, when it is judged that the first and second paper size information differ, the presenting means (by the host computer 1 in the embodiment) presents on the display 2 the print mode in which the paper size of the paper which is fed is changed as a kind of print mode which can be changed, so that the user can select and instruct a desired print mode before transferring the output information to the printer 4.

According to the invention, in the case where the judging means (by the CPU (not shown) of the host computer 1) judges that the first paper size information of the recording medium which can be fed from the printer 4 obtained by the obtaining means through a predetermined interface when the print request is inputted is different from the second paper size information for the set output information, the presenting means presents on the display 4 a plurality of kinds of print modes (modes shown in FIGS. 3 to 5) which can be changed, so that the user can select and instruct a desired print mode before transferring the output information to the printer 4 through the predetermined interface (for example, Centronics, RS232C, SCSI, SCSI2, or the like).

According to the invention, in the case where the judging means (by the CPU (not shown) of the host computer 1) judges that the first paper size information of the recording medium which can be fed from the printer 4 obtained by obtaining means through a predetermined network (for example, Ethernet (tradename) or the like) when the print request is inputted (in the embodiment, the CPU (not shown) of the host computer 1 obtains the first paper size information by communicating with the printer controller of the printer 4) is different from the second paper size information for the set output information, the presenting means presents on the display 4 a plurality of kinds of print modes which can be changed, so that the user can select and instruct a desired print mode before transferring the output information to the printer 4 through a predetermined network.

A print processing method of the printer system will now be described hereinbelow with reference to a flowchart of FIG. 2.

Figure 2:
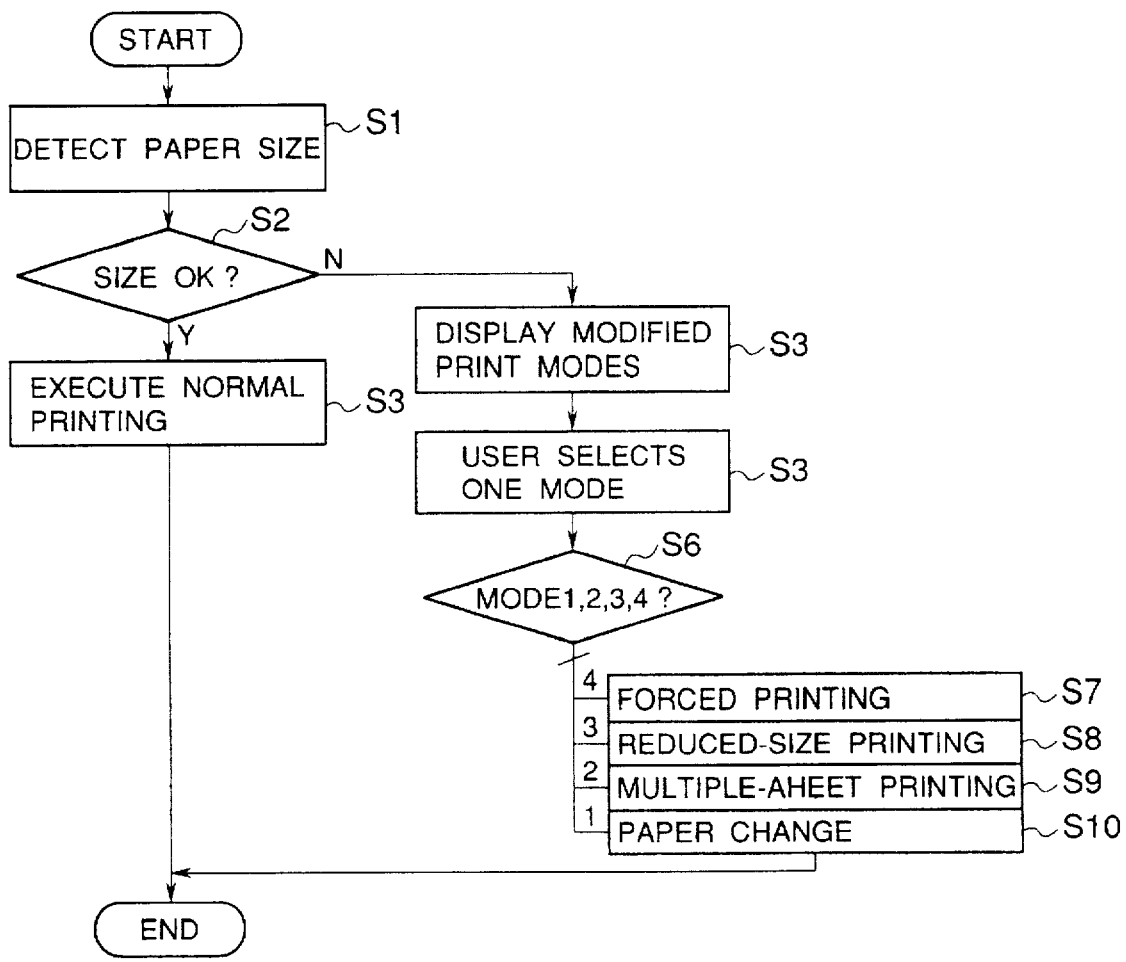
FIG. 2 is a flowchart showing an embodiment of a print processing method of the printer system according to the invention.

FIG. 2 is the flowchart showing an embodiment of the print processing method according to the invention. Reference characters S1 to S10 show processing steps. The host computer forms an image while communicating data with the printer. An operation flow of the host computer and the printer is shown in FIG. 2.

When a print command is sent from the host computer 1 to the printer 4, the printer 4 detects the size of papers which have been feedably set in the printer 4 by the sensor (not shown) and notifies to the host computer 1 in step S1.

The host computer 1 judges whether image data to be printed can be printed in the paper size notified by the printer 4 or not in step S2. If YES, step S3 follows. The image data is outputted to the printer 4 and is normally printed, and the processing routine is finished.

On the other hand, when it is judged that the image data cannot be printed within the paper in step S2, step S4 follows. In the embodiment, in order to determine how to print the image data, the apparatus displays four modified print modes of forced printing, reduced-size printing, multiple-sheet printing, and paper change which can be changed onto a screen of the display 2 and waits for a selecting instruction of the modified print mode from the user.

In step S5, the user selects either one of the modified print modes displayed on the display 2.

A check is subsequently made to see whether the modified print mode decided in step S6 is which one of the first to fourth modified print modes, the selected modified print mode is notified to the printer 4, the printing process such as forced printing, reduced-size printing, multiple-sheet printing, or paper change is executed and, after that, the processing routine is finished (steps S7 to S10).

The forced printing process (fourth modified print mode process) in step S7 shown in FIG. 2 will now be described hereinbelow with reference to FIG. 3.

Figure 3:
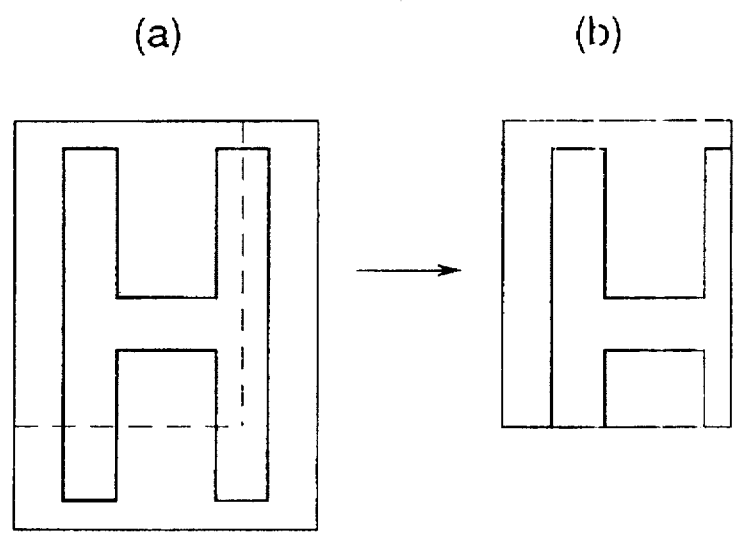
FIG. 3 is a schematic diagram for explaining a forced print processing state in the printer system according to the invention.

FIG. 3 is a schematic diagram for explaining a forced printing processing state in the printer system according to the invention. In an image (a) in FIG. 3, an image surrounded by a solid line is an image to be printed and the image data corresponds to a case of 'H'. An image surrounded by a broken line in the image (a) in FIG. 3 corresponds to a paper size of a paper which can be presently fed from the printer 4.

In such a setting state, when the user selects the printing in the forced print mode, the printing is forcedly performed by ignoring a portion which is out of the present paper and an image (b) in FIG. 3 is obtained as a print result.

In the diagram, the image (a) is output information (surrounded by the solid line) edited by the host computer 1 and the portion surrounded by the broken line corresponds to the paper size of the paper which can be presently fed from the printer 4. The image (b) corresponds a state in which the portion surrounded by the dotted line in the image (a) in FIG. 3 is forcedly outputted.

As shown in the diagram, in the case where the modified print mode selected by the user in step S5 in FIG. 2 is the forced print mode '4', only information matched with the paper size of the paper which can be fed can be outputted from the reference position in the edited output information.

Figure 4:
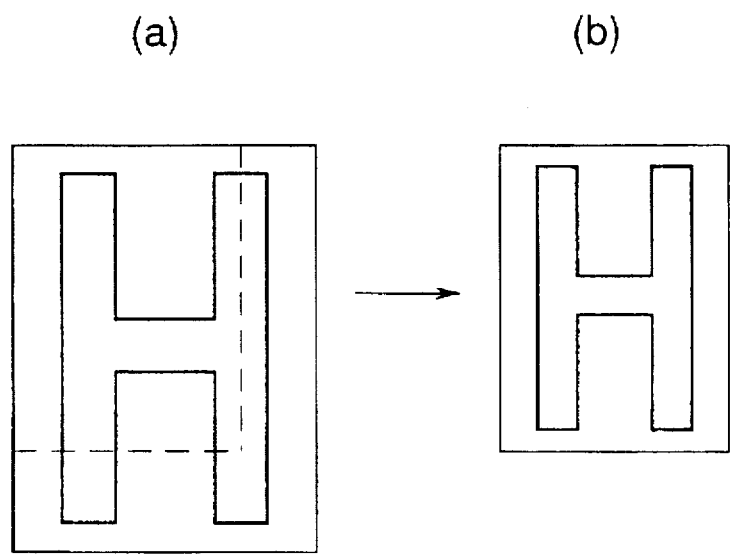
FIG. 4 is a schematic diagram for explaining a second modified print mode processing state in the printer system according to the invention.

FIG. 4 is a schematic diagram for explaining the second modified print mode processing state in the printer system according to the invention and corresponds to the reduced-size print mode.

In the diagram, an image (a) denotes the output information (surrounded by a solid line) edited by the host computer 1 and a portion within a broken line corresponds to the paper size of the paper which can be presently fed from the printer 4. An image (b) corresponds to a state in which the portion surrounded by the solid line in the image (a) is reduced in size and outputted in the paper size of the paper which can be fed.

As shown in the diagram, when the modified print mode selected by the user in step S5 in FIG. 2 is the reduced-size print mode of '3', the edited output information is reduced to the paper size of the paper which can be fed, thereby enabling all of the information to be outputted.

Figure 5:
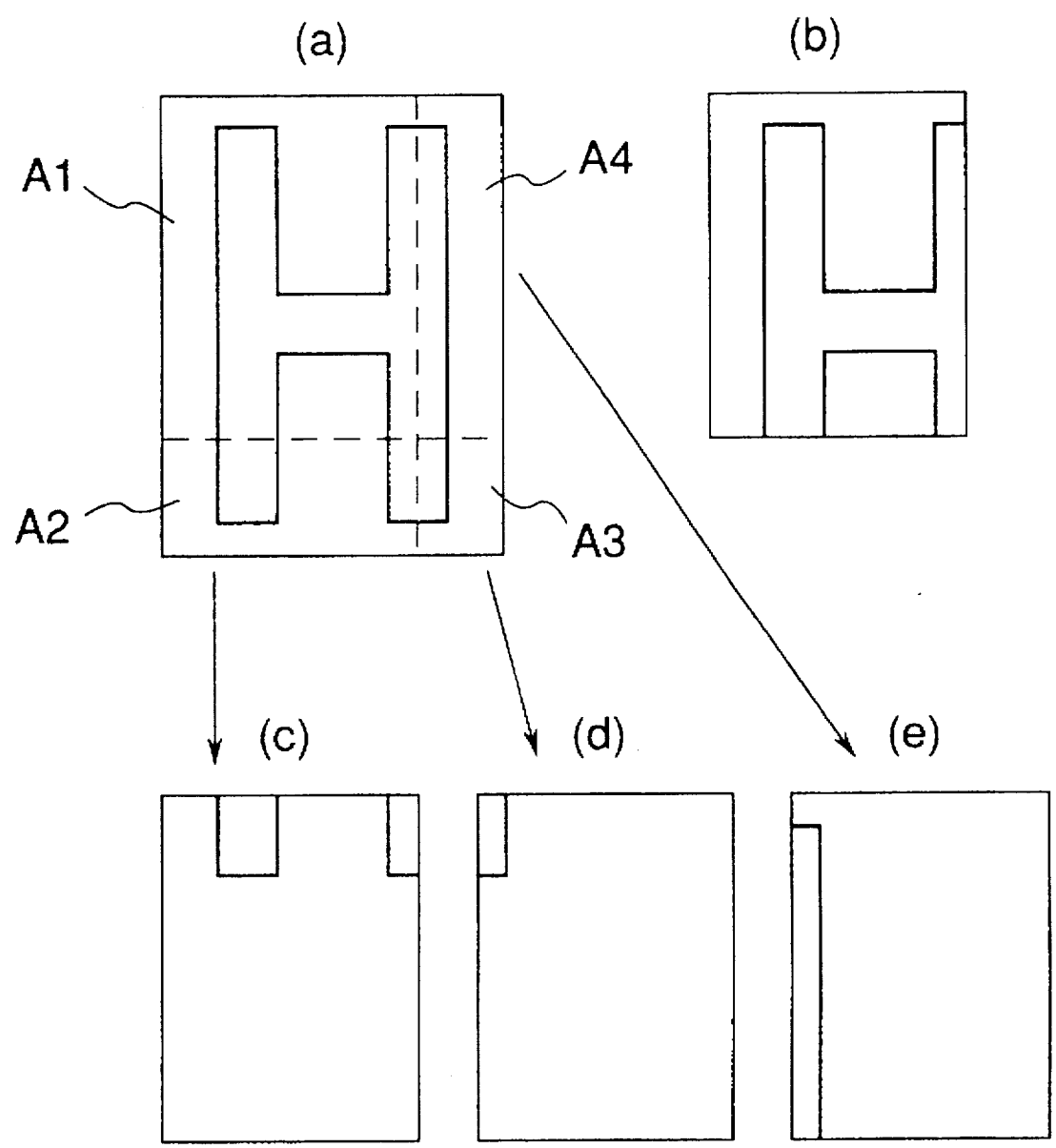
FIG. 5 is a schematic diagram for explaining a third modified print mode processing state in the printer system according to the invention.

FIG. 5 is a schematic diagram for explaining the third modified print mode processing state in the printer system according to the invention and corresponds to the multiple-sheet print mode.

In the diagram, an image (a) is the output information (surrounded by a solid line) edited by the host computer 1 and a portion surrounded by a broken line corresponds to the paper size of the paper which can be presently fed from the printer 4. Images (b) to (e) correspond to states in which the output information of the image (a) in FIG. 5 is divided to four portions A1 to A4 obtained by dividing the image (a) by the paper size of the paper which can be fed and by the paper size of the paper which can be fed from a reference point and the four output information A1 to A4 are divisionally outputted, respectively.

As shown in the diagram, when the modified print mode selected by the user in step S5 in FIG. 2 is the multiple-sheet print mode of '2', the edited output information is divided in the paper size of the paper which can be fed and is divisionally outputted onto a plurality of papers.

According to the above-mentioned embodiment, the paper size is detected in the printer and is transferred to the host computer, so that the size can be previously collated with the size of print data before printing. By notifying the print result to the user, the user can determine the printing method.

The invention can be applied to a system constructed by a plurality of equipment or to an apparatus comprising one equipment. The invention can be also applied to a case where the invention is achieved by supplying a program to a system or apparatus.

According to the invention as described above, in the case where the judging means judges that the first paper size information obtained by the obtaining means for obtaining the first paper size information of the recording medium which can be fed from the printer when the printing request is inputted is different from the second paper size information for the set output information, the presenting means presents on the display the kinds of print modes which can be changed, so that the user can select and instruct a desired print mode before transferring the output information to the printer.

According to the invention, when a desired kind of print mode is selected from the plurality of kinds of print modes presented on the display by the presenting means and is instructed, the notifying means notifies an instruction of a different print mode together with the output information to the printer on the basis of the kind of print mode selected and instructed, thereby enabling the output information to be outputted in a desired print mode from the printer.

According to the invention, when it is judged that the first and second paper size information differ, the presenting means presents on the display the mode in which a part of the output information is forcedly printed in the paper size of the paper which can be fed as a kind of print mode which can be changed, so that the user can select and instruct a desired print mode before transferring the output information to the printer.

According to the invention, when it is judged that the first and second paper size information differ, the presenting means presents on the display the mode in which the output information is reduced in size and printed in the paper size of the paper which can be fed as a kind of print mode which can be changed, so that the user can select and instruct a desired print mode before transferring the output information to the printer.

According to the invention, when it is judged that the first and second paper size information differ, the presenting means presents on the display the mode in which the output information is divided in the paper size of the paper which can be fed and is divisionally printed onto a plurality of papers as a kind of print mode which can be changed, so that the user can select and instruct a desired print mode before transferring the output information to the printer.

According to the invention, when it is judged that the first and second paper size information differ, the presenting means presents on the display the print mode in which the paper size of the paper which is fed is changed as a kind of print mode which can be changed, so that the user can select and instruct a desired print mode before transferring the output information to the printer.

According to the invention, in the case where the judging means judges that the first paper size information of the recording medium which can be fed from the printer obtained by the obtaining means through a predetermined interface when the print request is inputted is different from the second paper size information for the set output information, the presenting means presents on the display the plurality of kinds of print modes which can be changed, so that the user can select and instruct a desired print mode before transferring the output information to the printer through the predetermined interface.

According to the invention, in the case where the judging means judges that the first paper size information of the recording medium which can be fed from the printer obtained by the obtaining means through the predetermined network when the print request is inputted is different from the second paper size information for the set output information, the presenting means presents on the display the plurality of kinds of print modes which can be changed, so that the user can select and instruct a desired print mode before transferring the output information to the printer through the predetermined network.

Thus, there is an effect such that the printing in the desired print mode can be instructed at a proper timing when the output information to be printed is transferred to the printer.

What is claimed is:

1. An information processing apparatus used in conjunction with a printer, said apparatus comprising:
   discrimination means for discriminating whether a size of data to be printed by the printer is the same as a size of a print sheet available in the printer;
   display control means for controlling display means to display a plurality of items such that an operator may select at least one of the plurality of displayed items in the event that said discrimination means discriminates that the data size is different from the sheet size; and print control means for controlling the printer to print the data based on the at least one item selected by the operator.

2. An apparatus according to claim 1, wherein the plurality of items displayed by the display means includes a forced printing mode in which the data is printed without size change, a reduced-size printing mode in which the data is printed with reduced size, and a multiple-sheet printing mode in which the data is printed on a plurality of sheets.

3. An apparatus according to claim 1, further comprising means for obtaining information on the sheet size from the printer.

4. A print system comprising:

a printing apparatus; and an information processing apparatus comprising:
discrimination means for discriminating whether a size of data to be printed by said printing apparatus is the same as a size of a print sheet available in said printing apparatus;
display control means for controlling display means to display a plurality of items such that an operator may select at least one of the plurality of displayed items in the event that said discrimination means discriminates that the data size is different from the sheet size; and
print control means for controlling said printing apparatus to print the data based on the at least one item selected by the operator.

5. An information processing method used in conjunction with a printer, said method comprising steps of:

discriminating whether a size of data to be printed by the printer is the same as a size of a print sheet available in the printer;

controlling display means to display a plurality of items such that an operator may select at least one of the plurality of displayed items in the event that said discrimination step discriminates that the data size is different from the sheet size; and controlling the printer to print the data based on the at least one item selected by the operator.

6. A method according to claim 5, wherein the plurality of items displayed by the display means in said controlling step includes a forced printing mode in which the data is printed without size change, a reduced-size printing mode in which the data is printed with reduced size, and a multiple-sheet printing mode in which the data is printed on a plurality of sheets.

7. A method according to claim 5, further comprising a step of obtaining information on the sheet size from the printer.

8. A printing method comprising the steps of:

discriminating whether a size of data to be printed by a printer is the same as a size of a print sheet available in the printer;

controlling display means to display a plurality of items such that an operator may select at least one of the plurality of displayed items in the event that said discrimination step discriminates that the data size is different from the sheet size;

controlling the printer based on the at least one item selected by the operator; and printing the data using the printer controlled in said step of controlling the printer.

* * * * *

UNITED STATES PATENT AND TRADEMARK OFFICE
CERTIFICATE OF CORRECTION

PATENT NO. : 5,678,000
DATED : October 14, 1997
INVENTOR(S) : Ohtani

It is certified that error appears in the above-identified patent and that said Letters Patent is hereby corrected as shown below:

On the title page,

[54] Title:

Line 3, "PRINTER CONTROL APPARATUS" should read
--PRINTER CONTROL APPARATUS AND METHOD--.

[30] Foreign Application Priority Data:

"6-170586" should read --6-170596--.

SHEET 1 OF THE DRAWINGS:

In Fig. 2, "MULTIPLE-AHEET" should read
--MULTIPLE-SHEET--.

Signed and Sealed this

Eleventh Day of May, 1999

Attest:

Q. TODD DICKINSON

Attesting Officer

Acting Commissioner of Patents and Trademarks